United States Patent [19]

Piano

[11] 4,391,465

[45] Jul. 5, 1983

[54] ASSEMBLY SEPARATING A PASSENGER COMPARTMENT FROM AN ENGINE COMPARTMENT

[75] Inventor: Renzo Piano, Paris, France

[73] Assignee: Fiat Auto S.p.A., Turin, Italy

[21] Appl. No.: 263,136

[22] Filed: May 13, 1981

[30] Foreign Application Priority Data

May 20, 1980 [IT] Italy .............................. 67794 A/80

[51] Int. Cl.³ ............................................ B62D 25/08
[52] U.S. Cl. .................................. 296/208; 296/192; 296/194; 180/90
[58] Field of Search ................ 296/185, 191, 192, 194, 296/196, 197, 208, 31 P; 98/2.16, 2.19; 180/90

[56] References Cited

U.S. PATENT DOCUMENTS

| | | | |
|---|---|---|---|
| 2,092,542 | 9/1937 | Widman | 296/192 |
| 2,747,920 | 5/1956 | Ulrich | 296/208 |
| 3,596,978 | 8/1971 | Wessells | 296/194 |
| 3,788,681 | 1/1974 | Barenyi | 296/192 |
| 4,078,840 | 3/1978 | Itoh | 296/192 |

*Primary Examiner*—Robert R. Song
*Attorney, Agent, or Firm*—Merriam, Marshal & Bicknell

[57] ABSTRACT

The assembly comprises a first element made of a plastic material and having a width and a height equal to the width of the bodywork of the vehicle and to the distance between the floor of the passenger compartment and the windshield, respectively, and provided with means for fastening the assembly to the bodywork, and a second element made of a second plastic material and arranged to be fastened to the first element; the two elements are provided with walls and seatings which are arranged to generate the housing for the members and the devices of the ventilation system, the channels for the air and a support plate for the battery.

8 Claims, 3 Drawing Figures

ASSEMBLY SEPARATING A PASSENGER COMPARTMENT FROM AN ENGINE COMPARTMENT

BACKGROUND OF THE INVENTION

The present invention relates to an assembly of elements having the function of separating the passenger compartment from the engine compartment of a motor vehicle.

In the bodyworks for motor vehicles, in order to separate the passenger compartment from the engine compartment with a view of both providing a structure having a mechanical resistance sufficient to support some members and control and checking devices of the vehicle (dashboard, steering instruments, ventilation and heating system and the like), and insulating the passenger compartment from the engine both acoustically and in respect of a back fire, in the said separation region the bodywork comprises suitable panels and support members which are part of the bodywork and are arranged to serve as support for other elements fastenable to the bodywork itself and provided for attaining the said purposes.

As a support for the instruments there is provided a true dashboard arranged to be fixed to the said panels and elements of the bodywork; the flame resistance is ensured by the same panels (made of metal plate), whilst the sound-proofing is obtained by fastening to the said panels further panels and sheets of a suitable material; the positioning of the ventilation and heating system is carried out by fastening the respective devices to some of the aforementioned support elements and by connecting to the same, by means of suitable connection members, the various pipes so as to position them in the correct configuration.

Thus, it is clear that for completely assembling on the bodywork the various parts, members and devices which are necessary both for obtaining the acoustic and thermal insulation between the engine and the passenger compartment and for arranging the devices which are housed in the region of separation between the engine and the passenger compartment, a considerable amount of time is required; in addition, this assembling is particularly difficult because of the poor accessibility of the said region. Moreover, the various component elements of the described structure (support elements, connection members, boxes, pipes and the like), which have to be fixed to the bodywork and are necessary for attainig the aforementioned purposes, are numerous and their cost is rather high.

It follows that the construction of the bodywork parts disposed in the region of separation between the passenger compartment and the engine compartment gives rise to rather serious problems from the point of view of the assembly and the costs.

SUMMARY OF THE INVENTION

The object of the present invention is to provide an assembly of elements having the function of separating the passenger compartment from the engine compartment of a motor vehicle, which assembly will allow to overcome the aforementioned problems and eliminate the disadvantages described hereinabove.

The assembly according to the present invention is characterized in comprising a first panel-shaped element made of a first plastic material, having a width and a height which are substantially equal to the width of the bodywork and to the distance between the floor and the windshield of the passenger compartment, respectively, the said first element being provided with fastening means for fixing the said assembly to the said bodywork, and a second element made of a second plastic material having mechanical characteristics different from those of the first element, the said second element having a width substantially equal to that of the said bodywork, being provided with housings for the indicator and control instruments of the motor vehicle and being arranged to be fixed to the said first element in a stage prior to the stage of fastening of the complete assembly on the said bodywork.

BRIEF DESCRIPTION OF THE DRAWINGS

For a better understanding of the present invention an embodiment thereof will now be described, by way of non limiting example, with reference to the accompanying drawings, in which.

DETAILED DESCRIPTION OF THE INVENTION

Figure 1:
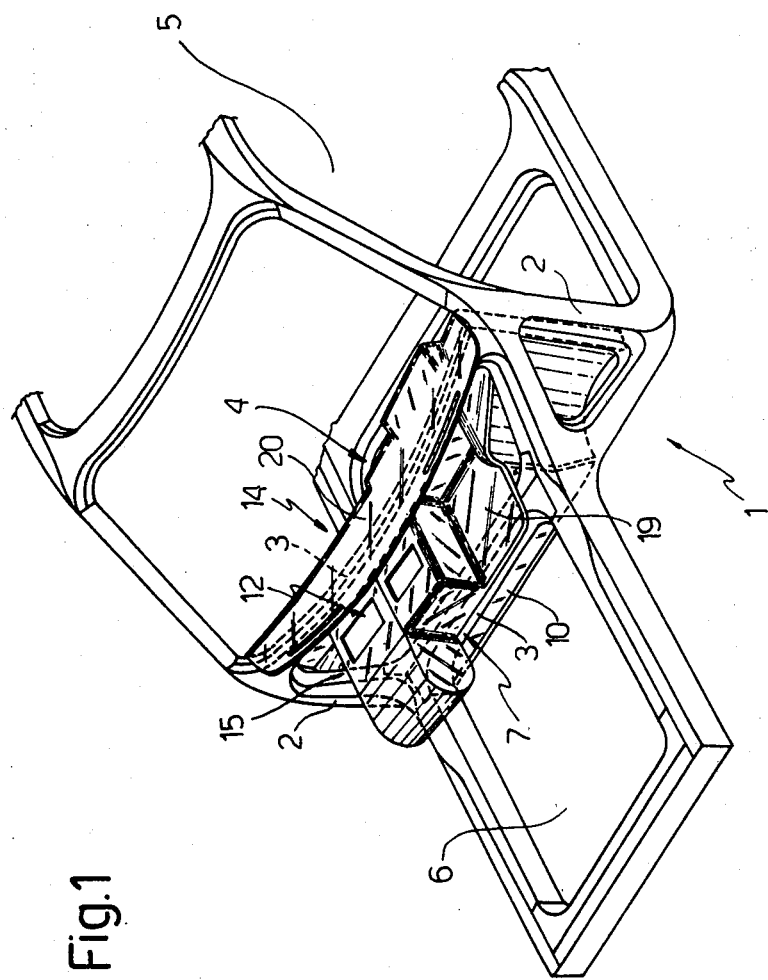
FIG. 1 is a perspective view of parts of the carrying structure of a motor vehicle, provided with the assembly of elements according to the present invention.

Although the assembly of elements according to the present invention is particularly fit for being disposed, in a way which will be described later, on a carrying structure having a mechanical resistance function, and partially shown in FIG. 1, it may be utilized also for a conventional type bodywork in which there is no panel disposed in the region which separates the passenger compartment from the engine compartment. The carrying structure indicated by reference numeral 1 in FIG. 1 (or the conventional type bodywork) has at least a pair of vertical stanchions 2 and eventually beams 3 arranged to connect the stanchions to one another.

Figure 2:
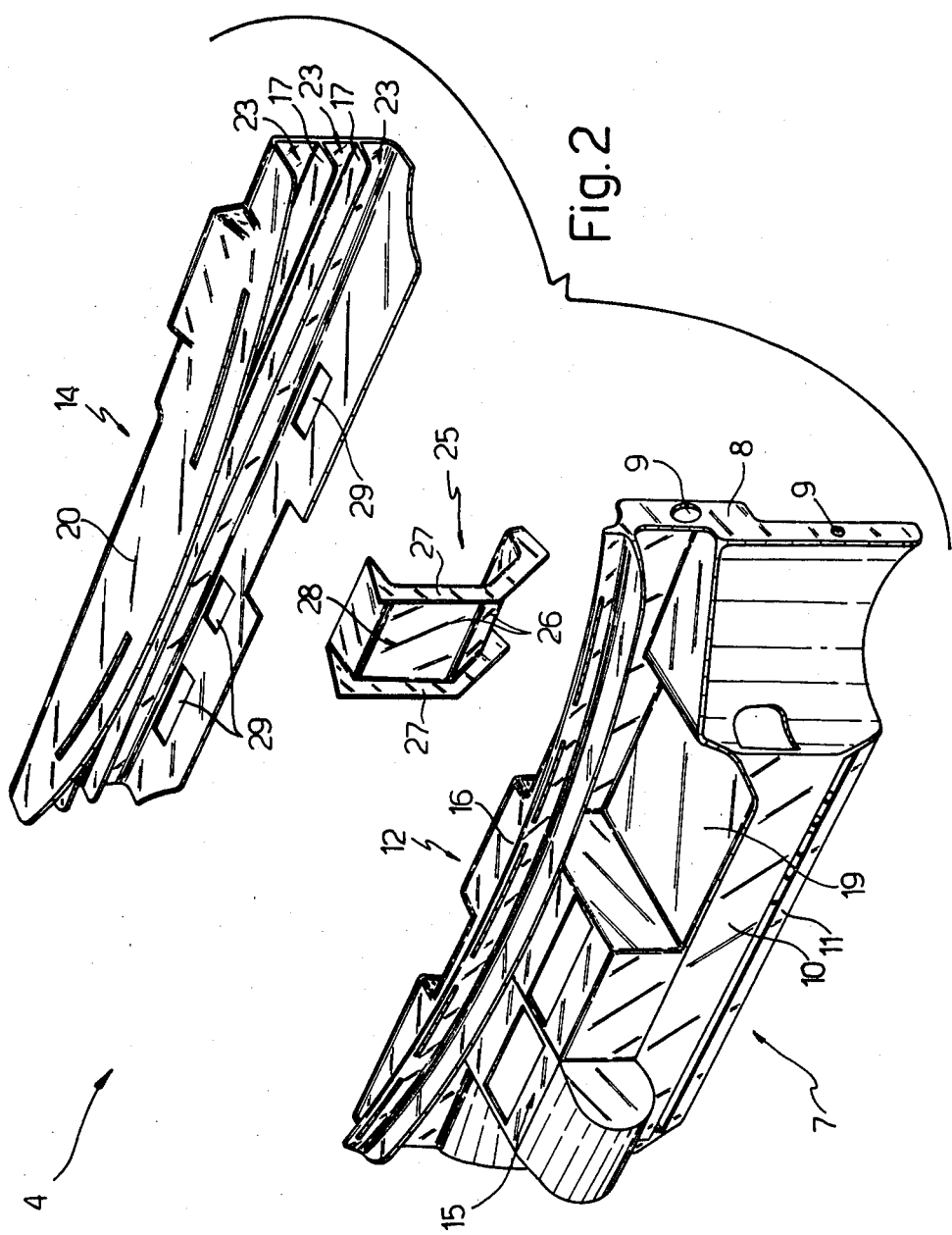
FIG. 2 is an exploded perspective view of the elements of the assembly.
Figure 3:
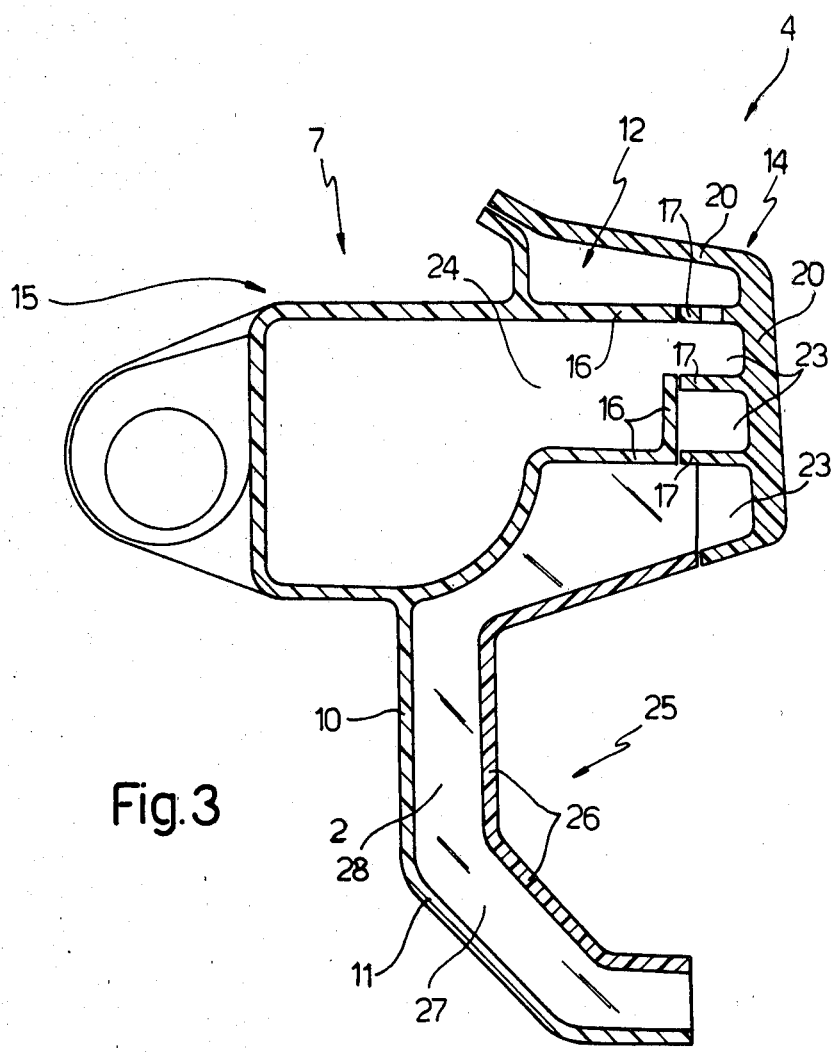
FIG. 3 is a sectional view of the assembly along a vertical plane passing through the center line of the assembly.

The assembly of elements according to the invention, indicated by reference numeral 4, is arranged to be inserted into the zone of separation between the passenger compartment 5 and the engine compartment 6. It comprises substantially, as can be seen in FIGS. 2 and 3, at least a first panel-shaped element made of a first plastic material and having a width and a height substantially equal to the width of the carrying structure 1 (distance between the stanchions 2) and to the distance between the floor and the windshield of the passenger compartment, respectively.

The said element is provided with fastening means for connecting the assembly of elements of the invention to the said carrying structure 1.

The said means may conveniently comprise a pair of vertical projections (FIG. 2) obtained in edge portions of the element and having holes 9 formed therein, and connection members, for example of the threaded type (not shown), arranged to pass through the said holes and to be screwed into corresponding threaded holes formed in the stanchions 2 (FIG. 1) or in members rigidily connected to these latter. Conveniently, the said fastening means may comprise other parts disposed on the first element 7 and on the beams 3 (FIG. 1) of the carrying structure 1, as well as other connection members arranged to connect the said parts to each other.

Element 7 comprises a lower portion, provided with two walls 10 and 11 (FIGS. 3 and 2), arranged to act as a true separation and insulation panel between the passenger compartment and the engine compartment and as a support for some members of the vehicle, such as the steering column, the control pedals of the vehicle and the like; it comprises also an upper portion 12 arranged both to serve as a support for a second element of the assembly indicated by reference numeral 14 and to generate with said element, in a manner which will be described later, suitable cavities and channels for the ventilation and heating system, and to form suitable housings and seatings, indicated generally by reference numeral 15 (FIGS. 2 and 3), for members and devices of the assembly.

Therefore, on the side turned towards the passenger compartment of the upper portion 12 of the said first element (which side is situated in the left-hand portion of FIG. 3 and in the non visible portion of the element in the perspective representation of FIG. 2), there are formed walls 16 (FIG. 3) arranged in any desired configuration, in order to obtain, in combination with corresponding walls 17 of the second element 14, the cavities and channels mentioned hereinabove; on the side turned towards the engine compartment, of the portion 12 of the first element 7 there are formed, integrally with the said element, the housings 15 (FIG. 2) whose shape and dimensions are suitable for accomodating therein members and devices of the ventilation and heating system. On the same side may conveniently be formed also a support wall 19 (FIG. 2) for the battery.

Conveniently, the material of which the said first element is made, is a plastic material having high mechanical and flame resistance and good stiffness and vibration and noise damping capacity.

Particularly suitable for the construction of the said element have proved to be such thermoplastic materials as the polycarbonates, the polyurethanes, the polypropylene, compact or structural foamed.

The second element 14 of the assembly (FIGS. 2 and 3) is made, as well, of a plastic material whose mechanical characteristics however are different from those of the first element 7, and has a width substantially equal to the width of the bodywork. It is provided with seatings and housing (not shown) for the indicator and control instruments of the motor vehicle and is apt to be fixed, in any suitable manner, to the said first element, for example by means of threaded connection members or the like.

The said second element may comprise a pair of front walls (FIG. 3) of any desirable configuration, and is provided, on the side turned towards the other element, with the walls 17 which, as already said before, are arranged to define, when the first and the second elements are joined to one another, suitable channels 23 for conveying the air of the ventilation system towards suitable conduits or openings disposed in the passenger compartment or on the second element, such as the openings 29. In the case of the embodiment shown, the walls 17 generate three substantially parallel channels 23, each of which communicates, as that situated higher, with a corresponding cavity 24 which is defined by means of the walls 16 of the first element and into which there may be introduced air under pressure (coming from the devices of the ventilation system).

The plastic material of which the second element 14 is made has a hardness and a mechanical resistance which are lower than those of the other element, since the said second element, besides exerting lesser mechanical resistance functions than those of the other element, has also the function of rendering less serious the consquences of the passengers bumping against the dashboard. Particularly suitable for manufacturing the second element 17 have proved to be such thermoplastic materials as the polyurethanes, the polyurethans and the polypropilene.

Conveniently, the assembly of elements according to the present invention comprises also a third element 25 (FIGS. 2 and 3) arranged to be fastened to the first element and comprising a series of front walls 26 and two sidewalls 27 orthogonal to the said front walls. This third element, which is provided with means for being fastened to the first element, as shown in FIG. 3, generates together with the walls 10 and 11 of the first element a channel 28 arranged to convey a flow of air coming, for example, from the channel 23 which is situated in a lower position in the second element 14.

The assembling operations of the assembly of elements described hereinabove and its connection to the carrying structure are carried out in the following manner.

First of all, into the first and second element are mounted all the members and devices necessary for the completion of the said elements; on the first element there may be mounted, inside the housings 15, the parts of ventilation and heating system, and on the second there may be mounted the indicator and control instruments of the dashboard; thereafter, the said two elements may be joined to one another, as shown in FIG. 2, thereby generating cavities, such as the cavity indicated by reference numeral 24, and channels, such as the channel 23, which are arranged to convey the air from the ventilation and heating system to suitable openings disposed on one of the said elements, such as the openings 29, or to other suitable channels.

Finally, the third element 25 is fastened to the said first and second elements, which third element is apt to generate the channel 28 which communicates with the channel 23, situated in a lower position in FIG. 3, with other suitable channels disposed in the passenger compartment.

Thus, it is clear that both because of the complete accessibility from any side to the various elements of the assembly and to the assembly thus obtained, and because of the moderate dimensions and weight of the said elements, the assembling operations of the assembly may be carried out with extreme easiness and in a very short period of time.

At the end of the said operations a completely equipped unit is obtained which is apt to be stored or sent directly to a vehicle assembly line.

Also the assembling of the assembly of elements on the carrying structure is extremely easy and quick, inasmuch as it is only necessary to fasten the projections 8 of the first element 7 of the assembly, by means of suitable connection members, to the stanchions 2 of the carrying structure, as has been shown in FIG. 1. Should such a modality be provided, the first element 7 is fixed also to the beams 3 of the carrying structure.

Thus, it is clear that with the assembly of elements according to the present invention a considerable simplification of the assembling and the construction of a bodywork is obtained, since this assembly provides a true unit equipped with all the accessory members and devices, which unit may be prepared separately from the bodywork in conditions of accessibility and handling which are quite better than those obtainable on the bodywork; finally, the said unit, by means of a very easy and rapid assembling operation, may be assembled directly on the bodywork in a station of the bodywork assembly line.

If one considers that in the separation zone between the passenger compartment and the engine compartment there are concentrated, more than in any other part of the bodywork, numerous parts, members and devices, which may be fixed directly onto the assembly of elements according to the present invention, the advantages obtainable by the present invention are evident.

It is clear that modifications and variations may be made to the described embodiment of the present invention, without departing from the scope of the invention itself.

I claim:

1. An assembly of elements having the function of separating the passenger compartment from the engine compartment of a motor vehicle, characterized in comprising a first panel-shaped element made of a first plastic material, having a width and a height which are substantially equal to the width of the bodywork and to the distance between the floor and windshield of the passenger compartment, respectively, the said first element being provided with fastening means for connecting the said assembly to the said bodywork, and a second element made of a second plastic material having mechanical characteristics different from those of the said first element, the said second element having a width substantially equal to that of the said bodywork, being provided with housings for the indicator and control instruments of the motor vehicle and being arranged to be fixed to the said first element in a stage prior to the stage of fastening of the complete assembly on the said bodywork.

2. An assembly as claimed in claim 1, characterized in that the said first element is provided with first cavities and with first walls on the side turned towards the second element, the said cavities and walls being apt, when the second element is fastened to the first element, to generate chambers and channels having predetermined configurations and shapes and arranged to form at least a portion of the conduits and chambers of the ventilation and heating system of the motor vehicle.

3. An assembly as claimed in claim 1 characterized in that the said first element comprises hollow parts integral with the element itself and arranged to generate seatings for accomodating therein members and devices of the said ventilation and heating system.

4. An assembly as claimed in claim 1, characterized in comprising at least a plate-shaped part integral with the element itself and arranged to serve as a support surface for the battery of the motor vehicle.

5. An assembly as claimed in claim 1, characterized in that the said second material has a mechanical resistance and a hardness which are smaller than those of the said first material.

6. An assembly as claimed in claim 5, characterized in that the said materials are selected among thermoplastic resins.

7. An assembly as claimed in claim 1, characterized in that the said fastening means comprise substantially vertical projections formed in the edge portions of the said first element, and connection members arranged to fasten each of the said projections to a corresponding stanchion of the said bodywork.

8. An assembly of elements having the function of separating the passenger compartment from the engine compartment of a motor vehicle, characterized in comprising:

a first panel-shaped element made of a first plastic material, having a width and a height which are substantially equal to the width of the bodywork and to the distance between the floor and windshield of the passenger compartment, respectively, the said first element being provided with fastening means for connecting the said assembly to the said bodywork, a second element made of a second plastic material having mechanical characteristics different from those of the said first element, the said second element having a width substantially equal to that of the said bodywork, being provided with housings for the indicator and control instruments of the motor vehicle and being arranged to be fixed to the said first element in a stage prior to the stage of fastening of the complete assembly on the said bodywork; and a third element, having U-shaped cross-sections and arranged to be fixed to the said first element and to form together with this latter a closed channel communicating with at least one of the said chambers or channels formed by the union of the said first element with the said second element.

* * * * *